(12) United States Patent
Pance et al.

(10) Patent No.: US 8,282,261 B2
(45) Date of Patent: Oct. 9, 2012

(54) WHITE POINT ADJUSTMENT FOR MULTICOLOR KEYBOARD BACKLIGHT

(75) Inventors: Aleksandar Pance, Saratoga, CA (US); Duncan Kerr, San Francisco, CA (US); Brett Bilbrey, Sunnyvale, CA (US); Brandon Dean Slack, Campbell, CA (US); Reese T. Cutler, Mountain View, CA (US)

(73) Assignee: Apple, Inc., Cupertino, CA (US)

( * ) Notice: Subject to any disclaimer, the term of this patent is extended or adjusted under 35 U.S.C. 154(b) by 521 days.

(21) Appl. No.: 12/475,993

(22) Filed: Jun. 1, 2009

(65) Prior Publication Data

US 2010/0300856 A1 Dec. 2, 2010

(51) Int. Cl.
*F21V 7/04* (2006.01)

(52) U.S. Cl. ........ 362/628; 362/610; 362/611; 362/612; 362/613; 362/615

(58) Field of Classification Search ........... 362/600–634
See application file for complete search history.

(56) References Cited

U.S. PATENT DOCUMENTS

| | | |
|---|---|---|
| 3,060,790 A | 10/1962 | Ward |
| 3,754,209 A | 8/1973 | Molloy et al. |
| 4,855,740 A | 8/1989 | Muramatsu et al. |
| 5,040,479 A | 8/1991 | Thrash |
| 5,317,105 A | 5/1994 | Weber |
| 5,342,991 A | 8/1994 | Xu et al. |
| 5,770,898 A | 6/1998 | Hannigan et al. |
| 5,975,953 A | 11/1999 | Peterson |
| 6,180,048 B1 | 1/2001 | Katori |
| 6,347,882 B1 * | 2/2002 | Vrudny et al. ............... 362/561 |
| 6,545,668 B1 | 4/2003 | Hayama |
| 6,654,174 B1 | 11/2003 | Huang |
| 6,713,672 B1 | 3/2004 | Stickney |
| 6,797,902 B2 | 9/2004 | Farage et al. |
| 6,800,805 B2 | 10/2004 | Deguchi |
| 6,834,294 B1 | 12/2004 | Katz |
| 6,879,317 B2 | 4/2005 | Quinn et al. |
| 6,998,594 B2 | 2/2006 | Gaines et al. |
| 7,001,060 B1 | 2/2006 | Kimura |

(Continued)

FOREIGN PATENT DOCUMENTS

CN 201185147 1/2009

(Continued)

OTHER PUBLICATIONS

Author Unknown, "Electronic Polymers, Semiconducting Polymers and Light Emitting Polymers—Focus of Polythiophene," Azom.com, http://www.azom.com/details.asp?ArticleID=2772, at least as early as Dec. 1, 2005.

(Continued)

*Primary Examiner* — William Carter
(74) *Attorney, Agent, or Firm* — Dorsey & Whitney LLP

(57) ABSTRACT

There are provided systems, devices and methods for operating a light source to match a white point of ambient light. In one embodiment, a light control system is provided. The light control system includes a light source and a light sensor. The light sensor is configured to operate in conjunction with the light source to provide a visual effect. A controller is electrically coupled to the light source and the light sensor and configured to determine the intensity and color of light to which the light sensor is exposed and dynamically adjust the output of the light source to match the determined intensity and color of light to which the light sensor is exposed.

12 Claims, 13 Drawing Sheets

U.S. PATENT DOCUMENTS

| | | |
|---|---|---|
| 7,019,242 B2 | 3/2006 | Kim |
| 7,053,799 B2 | 5/2006 | Yu et al. |
| 7,088,261 B2 | 8/2006 | Sharp et al. |
| 7,133,030 B2 | 11/2006 | Bathiche |
| 7,161,587 B2 | 1/2007 | Beck et al. |
| 7,236,154 B1* | 6/2007 | Kerr et al. ............ 345/102 |
| 7,281,837 B2 | 10/2007 | Yue et al. |
| 7,283,066 B2 | 10/2007 | Shipman |
| 7,315,908 B2 | 1/2008 | Anderson |
| 7,364,339 B2 | 4/2008 | Park |
| 7,417,624 B2 | 8/2008 | Duff |
| 7,446,303 B2 | 11/2008 | Maniam et al. |
| 7,453,441 B1 | 11/2008 | Iorfida et al. |
| 7,470,866 B2 | 12/2008 | Dietrich et al. |
| 7,473,139 B2 | 1/2009 | Barringer et al. |
| 7,557,312 B2 | 7/2009 | Clark et al. |
| 7,557,690 B2 | 7/2009 | McMahon |
| 7,582,839 B2 | 9/2009 | Kyowski et al. |
| 7,598,686 B2 | 10/2009 | Lys et al. |
| 7,692,111 B1 | 4/2010 | Rosing et al. |
| 7,712,910 B2 | 5/2010 | Ng et al. |
| 7,750,282 B2 | 7/2010 | Mahowald et al. |
| 7,750,352 B2 | 7/2010 | Thurk |
| 7,778,590 B2 | 8/2010 | Kogo |
| 7,825,907 B2 | 11/2010 | Choo et al. |
| 7,825,917 B2 | 11/2010 | Bryant et al. |
| 7,863,822 B2 | 1/2011 | Stoschek et al. |
| 7,880,131 B2 | 2/2011 | Andre et al. |
| 7,968,835 B2 | 6/2011 | Tsai |
| 8,160,562 B2 | 4/2012 | Yuki et al. |
| 8,232,958 B2 | 7/2012 | Tolbert |
| 2003/0043589 A1 | 3/2003 | Blank |
| 2003/0174072 A1 | 9/2003 | Salomon |
| 2003/0210221 A1 | 11/2003 | Aleksic |
| 2004/0032745 A1 | 2/2004 | Pederson |
| 2004/0195494 A1* | 10/2004 | Kok et al. ............ 250/214 AL |
| 2004/0204190 A1 | 10/2004 | Dietrich et al. |
| 2004/0230912 A1 | 11/2004 | Clow et al. |
| 2004/0238195 A1 | 12/2004 | Thompson |
| 2005/0073446 A1 | 4/2005 | Lazaridis et al. |
| 2006/0022951 A1 | 2/2006 | Hull |
| 2006/0033443 A1 | 2/2006 | Ishii et al. |
| 2006/0042820 A1 | 3/2006 | Lin et al. |
| 2006/0158353 A1 | 7/2006 | Tseng |
| 2006/0158881 A1* | 7/2006 | Dowling ............ 362/231 |
| 2007/0046646 A1 | 3/2007 | Kwon et al. |
| 2007/0090962 A1 | 4/2007 | Price et al. |
| 2008/0001787 A1 | 1/2008 | Smith et al. |
| 2008/0111500 A1 | 5/2008 | Hoover et al. |
| 2008/0127537 A1 | 6/2008 | Boisseau |
| 2008/0143560 A1 | 6/2008 | Shipman |
| 2008/0166006 A1 | 7/2008 | Hankey et al. |
| 2008/0303918 A1* | 12/2008 | Keithley ............ 348/223.1 |
| 2009/0173533 A1 | 7/2009 | Brock et al. |
| 2009/0173534 A1 | 7/2009 | Keiper et al. |
| 2009/0176391 A1 | 7/2009 | Brock et al. |
| 2009/0201179 A1 | 8/2009 | Shipman et al. |
| 2009/0261743 A1* | 10/2009 | Chen et al. ............ 315/192 |
| 2009/0277763 A1 | 11/2009 | Kyowski et al. |
| 2010/0008030 A1 | 1/2010 | Weber et al. |
| 2010/0044067 A1 | 2/2010 | Wong et al. |
| 2010/0238120 A1 | 9/2010 | Hsieh |
| 2010/0265181 A1 | 10/2010 | Shore |
| 2010/0301755 A1 | 12/2010 | Pance et al. |
| 2010/0302169 A1 | 12/2010 | Pance et al. |
| 2010/0306683 A1 | 12/2010 | Pance et al. |
| 2011/0280042 A1 | 11/2011 | Pance et al. |
| 2011/0304485 A1 | 12/2011 | Mahowald et al. |
| 2012/0012448 A1 | 1/2012 | Pance et al. |
| 2012/0013490 A1 | 1/2012 | Pance |

FOREIGN PATENT DOCUMENTS

| | | |
|---|---|---|
| EP | 1566686 | 8/2005 |
| EP | 1881513 | 1/2008 |
| EP | 2017694 | 1/2009 |
| GB | 2431001 | 4/2007 |
| JP | 60004094 | 1/1985 |
| JP | 04212289 | 8/1992 |
| JP | 04324294 | 11/1992 |
| JP | 05238309 | 9/1993 |
| JP | 06251889 | 9/1994 |
| JP | 06318050 | 11/1994 |
| JP | 07014694 | 1/1995 |
| JP | 10073865 | 3/1998 |
| JP | 2000098942 | 4/2000 |
| JP | 2005032470 | 2/2005 |
| JP | 2005293853 | 10/2005 |
| JP | 2006041043 | 2/2006 |
| KR | 100870113 | 11/2008 |
| WO | WO2007/002796 | 1/2007 |
| WO | WO2007/102633 | 9/2007 |
| WO | WO2009/136929 | 11/2009 |

OTHER PUBLICATIONS

Author Unknown, "Long Polymers Light Up LEDs," Physicsweb.org, http://www.physicsweb.org/articles/news/6/4/22/1, at least as early as Apr. 30, 2002.

Author Unknown, "Optimus Keyboard," Art.Lebedev Studio, http://www.artlebedev.com/portfolio/optimus/, at least as early as Dec. 1, 2005.

Author Unknown, "Optimus OLED Keyboard," Gizmodo: The Gadgets Weblog, http://www.gizmodo.com/gadgets/peripherals/input/optimus-oled-keyboard-112517.php, at least as early as Dec. 1, 2005.

Author Unknown, "Optimus OLED Keyboard with Customizable Layout," Gear Live, http://www.gearlive.com/index.php/news.article/optimus_oled_keyboard_07131058/, at least as early as Dec. 1, 2005.

Author Unknown, "Optimus Russian Keyboard," Primo Tech, http://www.primotechnology.com/index.php?art+articles/0705/optimus/index.htm, at least as early as Dec. 1, 2005.

Author Unknown, "Organic Light-Emitting Diode," Wikipedia.com, http://en.wikipedia.org/wiki/OLED, at least as early as Dec. 1, 2005.

Author Unknown, "Organic Polymers to Precede Nano Semi," EETimes.com, http://www.eet.com/story/OEG20030923S0055, at least as early as Dec. 1, 2005.

Author Unknown, "How, Why & Where to Use Self-Clinching Fasteners," Penn Engineering, http://www.pemnet.com/fastening_products/about_self_clinching/index.html, 2 pages, at least as early as Dec. 21, 2011.

Author Unknown, "Physics News Update," American Institute of Physics, http://www.aip.org/pnu/1993/split/pnu148-3.htm, Oct. 19, 1993.

Author Unknown, "Polymer Light-Emitting Diodes," Philips Research—Technologies, http://www.research.philips.com/technologies/display/polyled/polyled/, at least as early as Dec. 1, 2005.

Author Unknown, "What is OLED (Organic Light Emitting Diode)?," WiseGeek.com, http://www.wisegeek.com/what-is-an-oled.htm?referrer+adwords_campaign=oled_ad=024 . . . , at least as early as Dec. 1, 2005.

Author Unknown, "What is PLED? —A Word Definition from the Webopedia Computer Dictionary," http://www.webopedia.com/TERM/P/PLED/html, at least as early as Dec. 1, 2005.

Braun et al., "Transient Repsonse of Passive Matrix Polymer LED Displays," http://www.ee.calpoly.edu/~dbraun/papers/ICSM2000BraunEricksonK177.html, at least as early as Dec. 1, 2005.

Rojas, "Optimus Keyboard Trumped by the Display Keyboard?," http://www.engadget.com/2005/07/29/optimus-keyboard-trumped-by-the-display-keyboard/, Jul. 29, 2005.

\* cited by examiner

WHITE POINT ADJUSTMENT FOR MULTICOLOR KEYBOARD BACKLIGHT

CROSS-REFERENCE TO RELATED PATENT APPLICATIONS

The following related patent applications are hereby incorporated by reference in their entirety and for all purposes: U.S. patent application Ser. No. 12/476,000, titled "Keyboard With Increased Control of Backlit Keys" and filed concurrently herewith; U.S. patent application Ser. No. 12/476,040, titled "User Interface Behaviors For Input Device with Individually Controlled Illuminated Input Elements" and filed concurrently herewith; and U.S. patent application Ser. No. 12/476,067, titled "Light Source With Light Sensor" and filed concurrently herewith.

BACKGROUND

1. Technical Field

The present invention relates generally to lighted keyboards and, more particularly, to multicolored backlit keyboards.

2. Background Discussion

Electronic devices, including desktop computers, notebook computers, personal digital assistants, cell phones and mobile media devices, among others, have become ubiquitous in today's society. They serve as work tools, communication devices and provide entertainment. As such, they are operated in all types of lighting conditions. For example, electronic devices may be operated on an airplane with limited lighting or outdoors with the sun shining brightly. To help facilitate use of the electronic device regardless of lighting conditions, the keyboards and/or buttons on such devices may be provided with their own lighting. For example, in some instances, the keyboards have been lit by an LED or array of LEDs positioned under the keyboard. In other instances, the keyboards have been backlit by a light source placed under the keys of the keyboard.

SUMMARY

Certain embodiments may take the form of systems, devices and/or methods for adjusting a white point output of a light source according to ambient lighting conditions in which the light source is operating to provide a visual effect. The light control system includes a light source and a light sensor. In one embodiment, a light control system and light sensor are configured to operate in conjunction with the light source to provide a visual effect. Specifically, a controller is electrically coupled to the light source and the light sensor. The controller is configured to determine the intensity and color of light to which the light sensor is exposed and dynamically adjust the white point of the light output of the light source accordingly.

Another embodiment is of a method of operating a backlighting system of a keyboard. The method includes the operation of actuating a light sensor and determining a color of light, sensed by the sensor. A light source is then actuated such that an output of the light source is adjusted based on one or more characteristics of the determined color of sensed light to provide a desired white point for time output.

Yet another embodiment may take the form of or include a backlit keyboard. The backlit keyboard includes one or more light sources such as independently operable red LEDs, green LEDs and blue LEDs or multicolor LEDs. Additionally, the keyboard may include one or more light distribution networks to distribute light evenly to one or more keys of the keyboard, the keys may include a transparent portion through which light emitted from the one or more light sources may pass. One or more light sensors configured to sense ambient light may be included in the keyboard. A controller may be configured to determine intensity and color of the sensed ambient light. The controller actuates the red, green and blue LEDs (or multicolor LEDs) via pulse width modulation such that the light emitted from the one or more light sources visible through the transparent portion of the keys provides a determined white point effect relative to the intensity and color of the sensed ambient light.

DETAILED DESCRIPTION

Generally, one embodiment takes the form of a system for operating one or more light sources to produce a desired visual effect. In one embodiment, the light source(s) backlight one or more keys of a keyboard based on the amount of ambient light to which one or more keys of a keyboard are exposed. The system may be operated by a controller implemented in hardware and/or software. Additionally, the system typically includes one or more light sensors proximately located to the one or more keys of the keyboard so that the light sensors may determine or estimate the light falling on the one or more keys. The light sensor system may be capable of independently sensing different portions of the visible light spectrum, such as the red, green and blue components of the light spectrum. The system may then dynamically select and/or change the color, intensity, saturation or other aspect of the light emitted by the one or more light sources based on the sensed ambient light. Further, the system may include at least one optical system, such as a lightguide, for distributing light from the light sources relatively evenly and uniformly to every key and/or every illuminated part of every key of the keyboard.

The number of LEDs used as the light source may be selected to minimize or reduce the amount of power consumed while providing the desired level of brightness, color, saturation, etc. Additionally, perceived brightness and color of the LEDs may be influenced by the optical system distributing radiated light from the LEDs. For example, the optical system may include a lightguide, filters, etc. that may influence perceived color and brightness of the LEDs.

In one embodiment, a microcontroller may vary operation of the light sensor and the light source such that the light sensor is not influenced by light emitted by the light sources. That is, the light source is off while the light sensor is on and vice-versa. Thus, the light sensors may sense only ambient light and be used to determine certain operating conditions of the light source. The controller adjusts the output of the light sources according to determined ambient conditions in which the light sources is operating to create the desired visual effect. Specifically, the controller may dynamically adjust the white point of the LEDs' output based on periodical sensing of the R, G, and B components of the ambient light. As used herein, "white point" refers to coordinates in a chromaticity curve that define the color "white."

Figure 1:
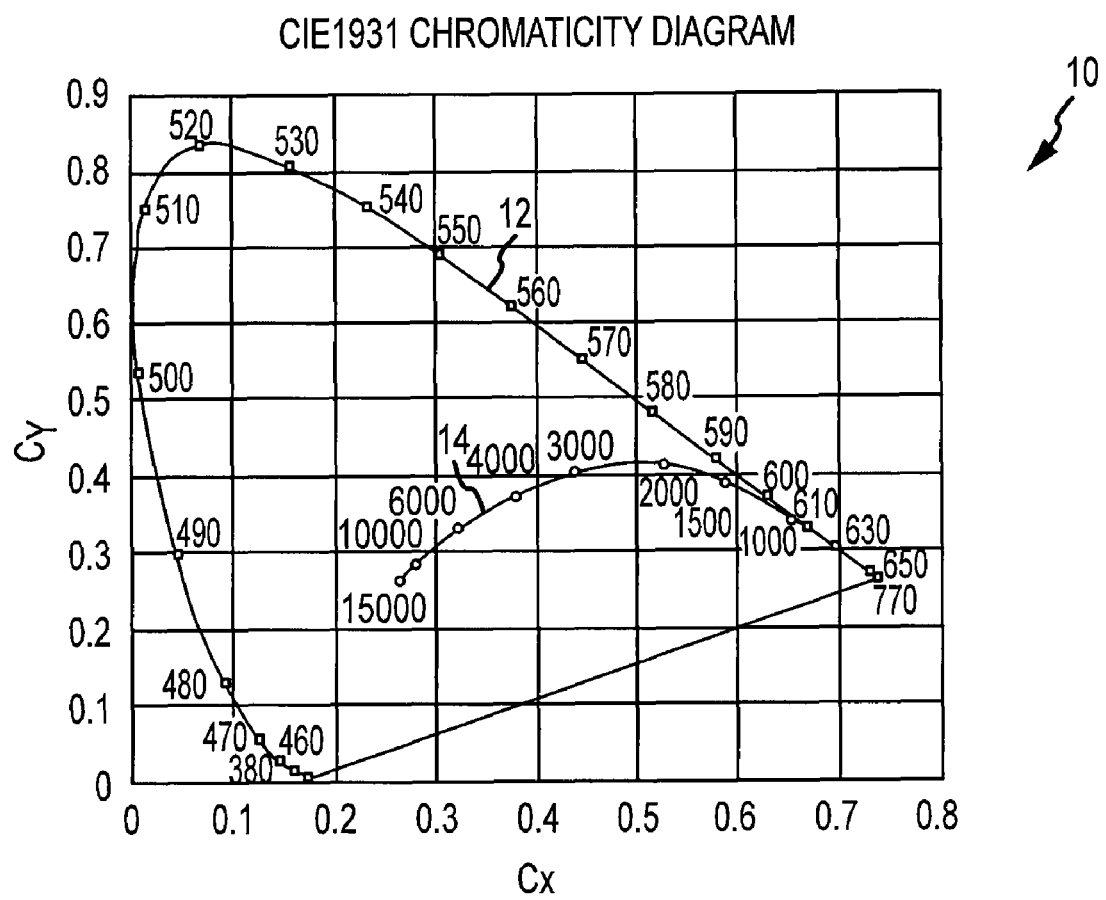
FIG. 1 illustrates a chromaticity curve.

In particular, FIG. 1 illustrates a plot 10 of a chromaticity curve 12 from the CIW (Commission International de l'Eclairage). The circumference of the chromaticity curve 12 represents the range of wavelengths in nanometers of visible light and, hence, represents true colors, whereas points contained within the area defined by the chromaticity curve 12 represent a mixture of colors. A Planckian curve 14 is shown within the area defined by the chromaticity curve 12 and corresponds to colors of a black body when heated. The Planckian curve 14 passes through a white region (i.e., the region that includes a combination of all the colors) and, as such, the term "white point" is sometimes generalized as a point along the Planckian curve 14 resulting in either a bluish white point or a yellowish white point. However, for the purposes of the present disclosure, "white point" may also include points that are not on the Planckian curve 14. For example, in some cases the white point may have a reddish hue, a greenish hue, or a hue resulting from any combination of colors. The perceived white point of light sources may vary depending on the ambient lighting conditions in which the lights source is operating.

Figure 2A:
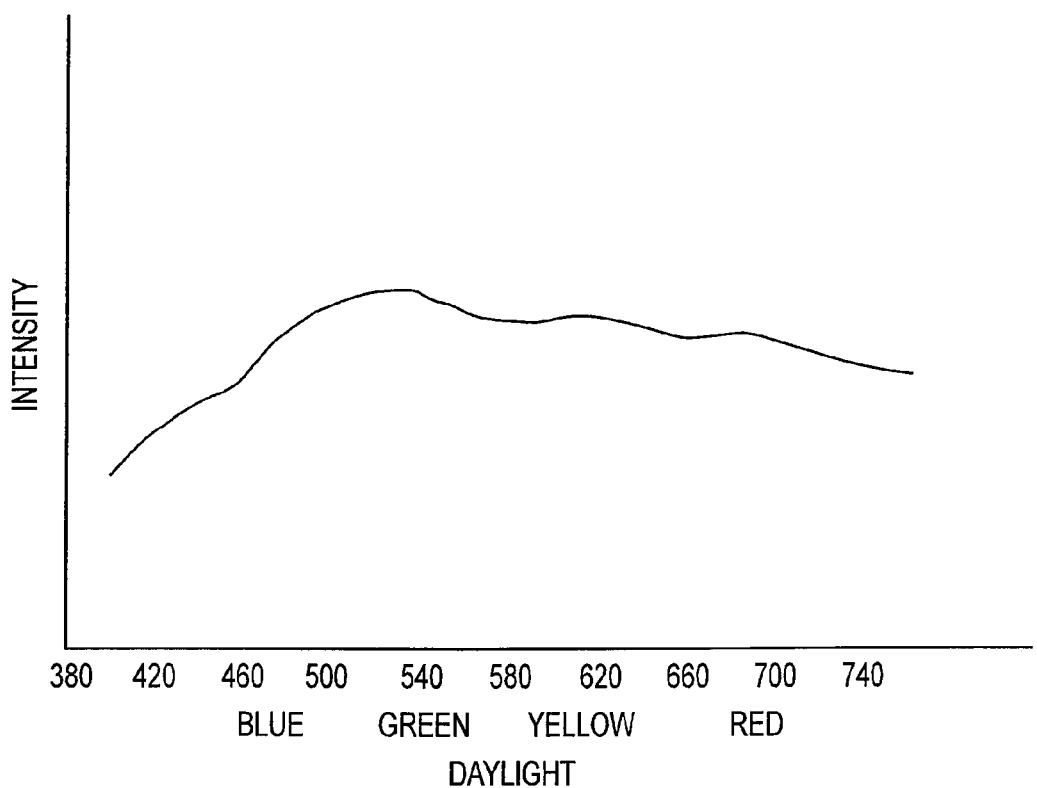
FIGS. 2A and 2B illustrate spectral power distribution curves for daylight and incandescent light, respectively.
Figure 2B:
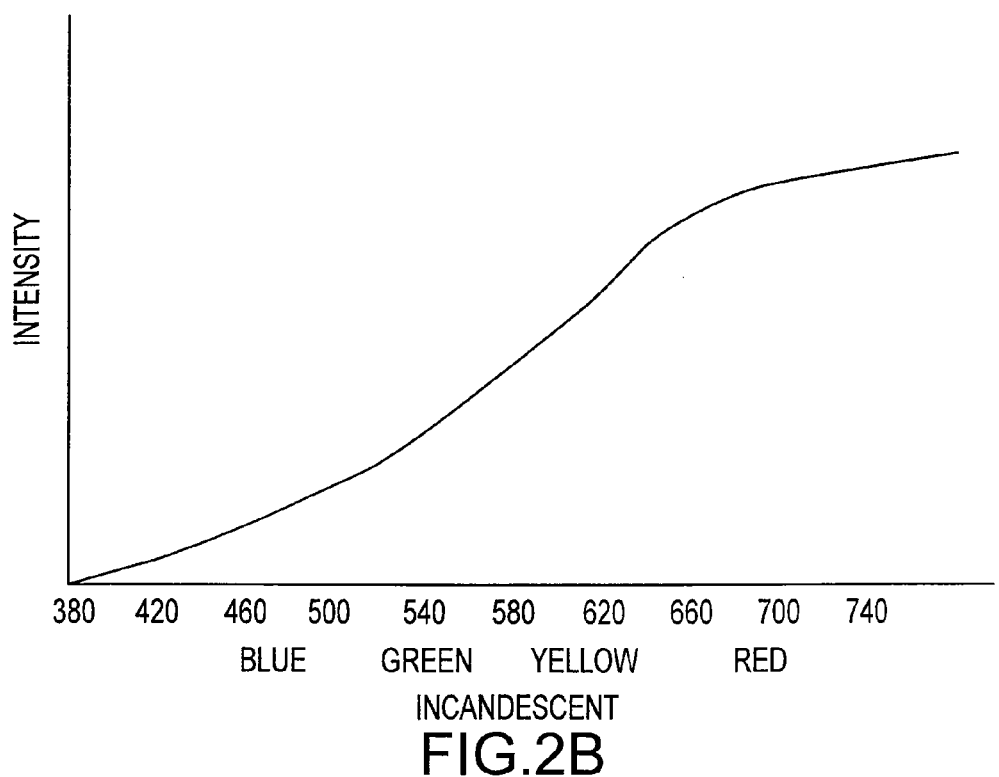

In accordance with aspects of the present disclosure, the white point of the LEDs may be adjusted to achieve a desired white point based on, or to compensate for, the determined ambient light. For example, FIG. 2A illustrates a spectral distribution plot of representing daylight. In the plot, the horizontal axis represents the wavelength of light in nanometers and the vertical axis represents the intensity of light. Generally, the intensity of light may be represented in lumens or, for the purposes of a photosensor, an electrical current may be correlated to lumens and, hence, amperes may be used as units of light intensity. As can be seen, although all wavelengths of the visible spectrum are represented, the wavelengths with the highest intensity are in the blue-green range. In contrast, FIG. 2B illustrates a spectral distribution plot representing incandescent lighting. As can be seen, incandescent lighting is weighted towards the yellow and red end of the spectrum. A light source providing a constant color output would appear to have a different white point in daylight and under incandescent lighting because of the different color of light provided by daylight and incandescent lighting. Accordingly, embodiments of the present disclosure provide dynamic white point adjustment to achieve a desired visual effect or compensate for the spectral makeup of ambient light. Various algorithms, including transitions and fade in/out routines based on linear, multi-linear, logarithmic or power laws, may be implemented to accomplish dynamic changes in the white point output based on the ambient light. Examples of the various transition algorithms may be found in U.S. patent application Ser. No. 11/558,376, titled, "Brightness Control of a Status Indicator Light,", which is incorporated herein by reference in its entirety and for all purposes.

Figure 3:
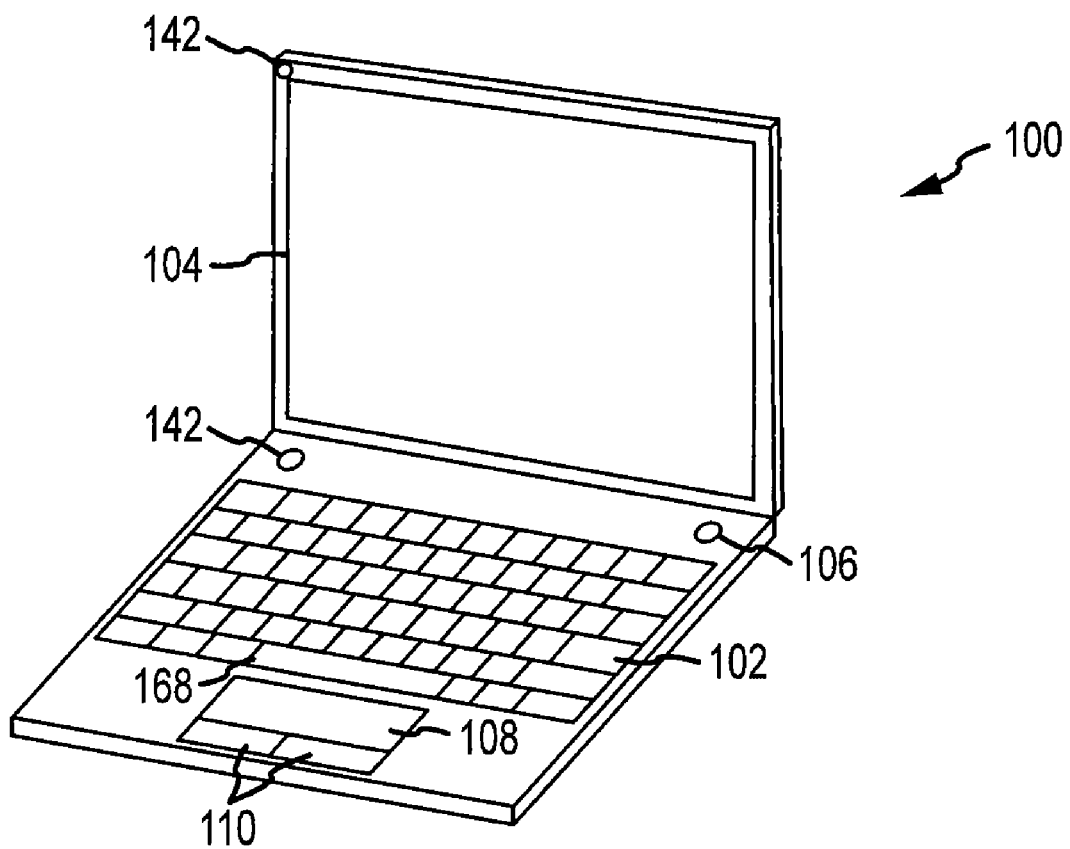
FIG. 3 illustrates a portable computing device.
Figure 4:
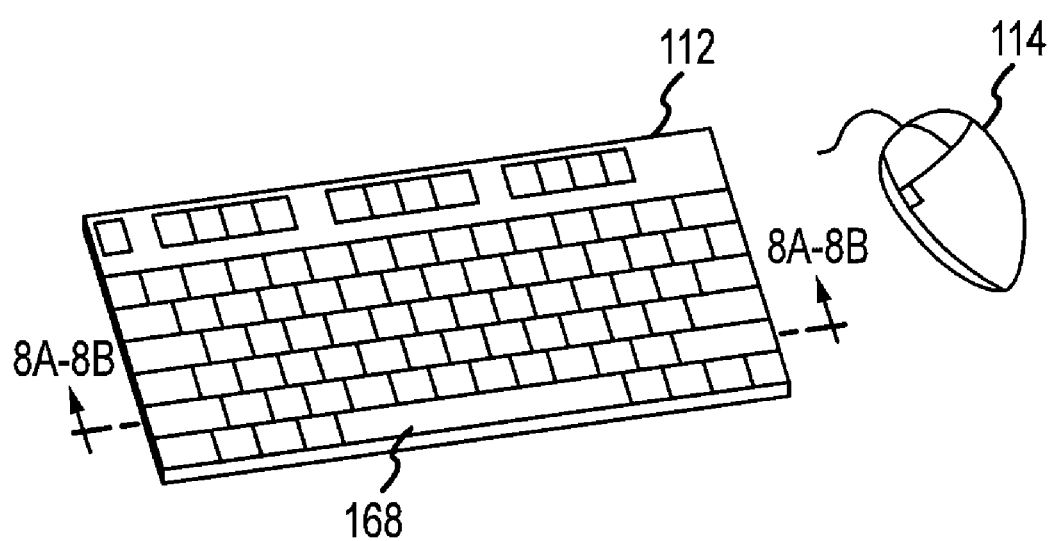
FIG. 4 illustrates a keyboard and mouse for use with the computing device of FIG. 3.

Referring to FIG. 3, a notebook computer 100 is shown that may be configured to provide white point adjustment to a backlit keyboard 102. In addition to the keyboard 102, the notebook computer 100 may include a display 104, a power button 106, a track pad 108, and other functional buttons 110. The notebook computer 100 may be configured to execute applications and operating system programs. A user may interact with the notebook computer 100 via the keyboard 102, the track pad 108, the buttons 110, or other input devices. Additionally, these and other peripheral devices (not shown) may be communicatively coupled, in a wired and/or wireless fashion, to the notebook computer 100 to allow the user to interact with the computer. For example, FIG. 4 illustrates a keyboard 112 and a mouse 114 that may be wirelessly communicate with the notebook computer 100 through radio frequency (RF), infrared, Bluetooth, or any other suitable wireless communication protocol. In other embodiments, the keyboard 112, the mouse 114 and the notebook computer 100 may communicate through wired connections. In other embodiments, the keyboard 112 and mouse 114 may be operatively coupled with a desktop computer. It should be understood that the various embodiments described herein may be physically or logically implemented in the keyboard 102, keyboard 112, or any other device or surface to achieve the described functionality. As such, although reference may be made to keyboard 112 it should be understood that the white point, intensity, color, etc. adjustments may be implemented in embodiments other than the keyboard 112.

The keyboard 112 may be a traditional 101/104 key keyboard used in the United States of America, a 102/105 key keyboard commonly used in Europe, or any other suitable keyboard or number pad. The keyboard 112 may have a letter, number, symbol, or function ("indicator" collectively) indicated on a top surface of the key that may be translucent or transparent so that light may pass through the key. Specifically, in one embodiment, indicator may be a clear portion of an otherwise opaque surface of a key so that the indicator acts as a window for light to pass through. In an alternative embodiment the indicator may be printed on a translucent surface. In any case, the keys may be illuminated using a backlight, which will be discussed in detail below, such that a user may easily recognize the different keys, in low light or no light environments.

Figure 5:
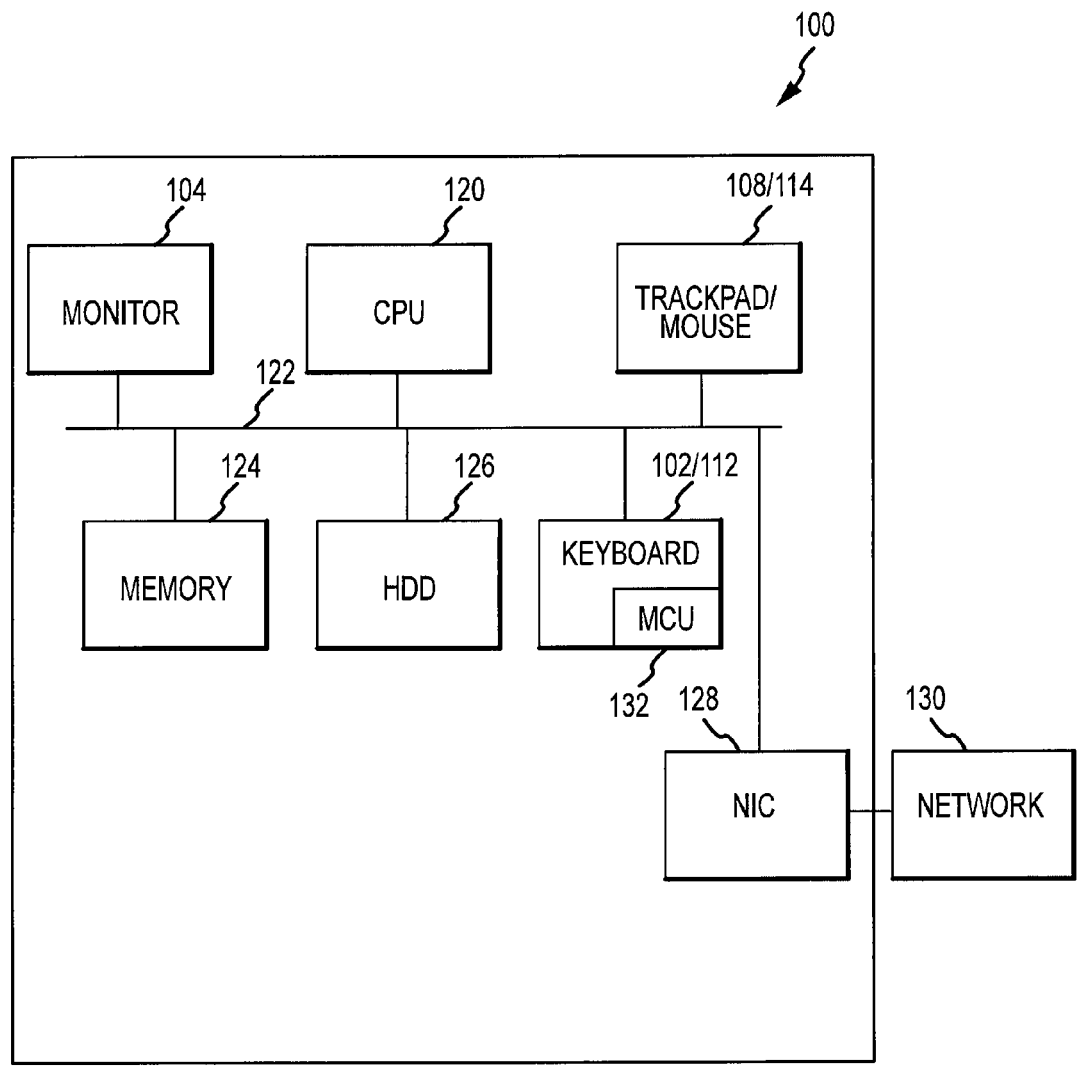
FIG. 5 is a simplified block diagram of a computer system.

Turning to FIG. 5, a simplified block diagram of the notebook computer 100 is illustrated. As can be seen, the notebook computer 100 may include a central processing unit (CPU) 120 that may be configured to process data and execute applications and programs. The CPU 120 may be any suitable microprocessor and may include one or more processing cores. As one example, in some embodiments, the CPU 120 may be a microprocessor manufactured by Intel, such as the 80X86, or Core 2 Duo® processor.

The CPU 120 may be communicatively coupled to other component parts of the computer 100. Specifically, in some embodiments, the CPU 120 may be coupled to other component parts of the computer 100 via one or more busses. In some embodiments, the computer 100 may have multiple busses coupled between the CPU and dedicated chip sets, memory or device expansion slots, for example, such as a Northbridge chip, RAM and/or a PCI graphics board. Busses may also transmit data between chip sets, such as from the Northbridge chip to the Southbridge chip and vice versa. For the sake of simplicity, however, only a single bus 122 is illustrated.

Memory 124 may be random access memory (RAM), such as dynamic RAM or static RAM, or any other type of memory including flash memory and read-only memory. Other devices, such as a storage memory 126, a keyboard 112 and/or mouse 114, a network interface device 128, and a monitor 104, for example, may also be coupled to the bus 122. The storage memory 126 may be any type of non-volatile computer readable medium such as a hard disk drive, a semiconductor disk drive, a tape drive, flash drive etc. The storage memory 126 may store data, applications, programs, and/or the operating system. The network interface device 128 may allow for the computer system 100 to communicate over a network 130 with other computer systems or devices.

The keyboard 112 includes a microcontroller unit ("controller") 132 that may control the backlighting of the keyboard 112. The controller 132 may actuate the light source 144 by pulse-width modulating the input to the source. The controller may also activate time light sensor 142 as necessary, often cycling it with the light source in a manner described below with respect to FIG. 14. In some embodiments, the controller 132 may be a model 8742 manufactured by Intel Corporation, or a PIC16F84 manufactured by Microchip, Inc. In other embodiments, the controller 132 may be part of a larger integrated circuit, such as a microprocessor capable of running in either master or slave modes. The microcontroller 132 may include hardware and/or software to control actuation of the light sensor 142 and the light source 144. Additionally, in some embodiments, the controller 132 may be communicatively coupled to the CPU 120 of the computer 100 or another microcontroller of the computer 100. Further, in yet another embodiment, the controller 132 may be a multi-channel LED driver with precise current setting and matching across all LEDs being driven by the controller. In such an embodiment, the LEDs may be driven with one or more low side field effect transistors. These transistors are typically internal to the controller 132, but may be external. Further, in this embodiment the resistors 192 are generally unnecessary. Examples of multi-channel LED drivers include the LTC3220 driver, manufactured by Linear Technology and the TLC5940 driver, manufactured by Texas Instruments. It should be understood that other drivers may be used; these two are provided as examples only and are not intended to be limiting.

The controller 132 dynamically adjusts the intensity and color output of the light source 144 based on a sensed ambient light and desired white point. In one embodiment, the intensity and color may be adjusted to match the ambient lighting. For example, in one embodiment, if the display 104 of the computer 100 shows a bright green image, such that it is the primary source of light that strikes the keyboard 112, the backlighting of the keyboard 112 may adjusted to have a greenish hue. Additionally or alternatively, when the keyboard is outside and the sunlight provides the ambient lighting, the white point of the ambient light may be determined and the keyboard 112 may be backlit accordingly to a desired white point. For example, the keyboard 112 may be backlit to provide a soft white hue, yellowish hue, bluish hue or other color depending on the ambient circumstances, for example, if the keyboard is being used in an office setting with a yellowish fluorescent lighting. Additionally, the intensity or brightness of the backlighting may be adjusted based on the brightness of the ambient light.

Figure 6A:
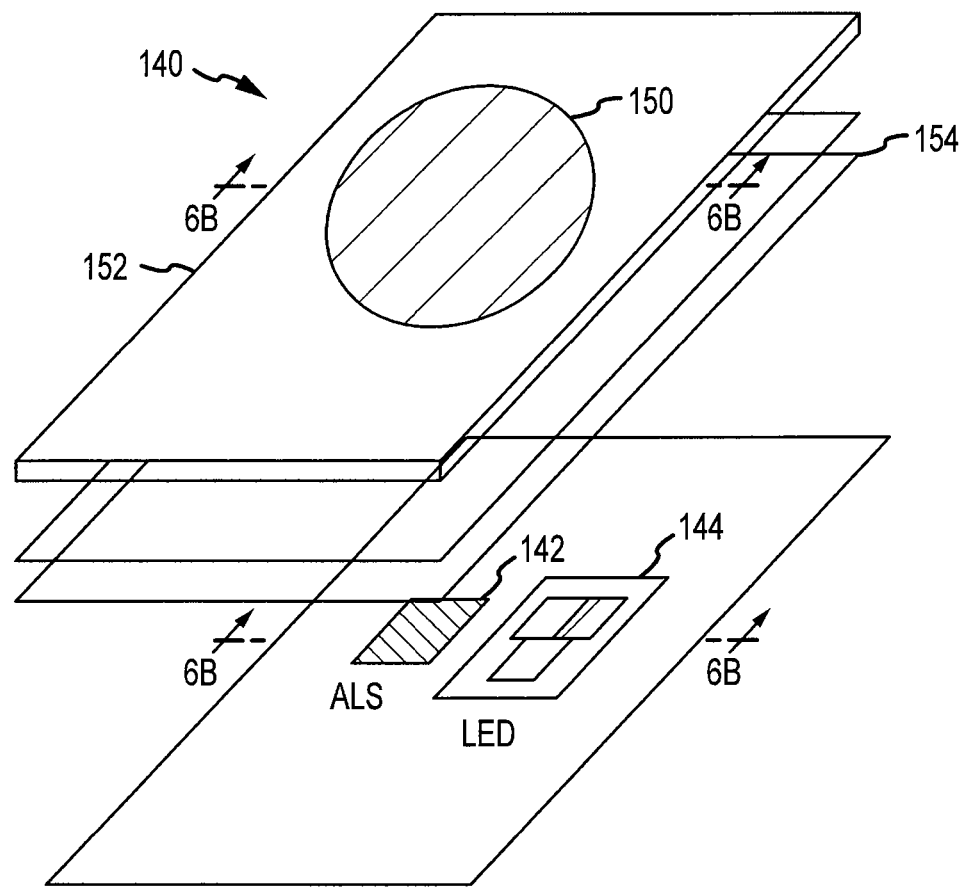
FIG. 6 is an expanded view of a device incorporating a light sensor and light source.
Figure 6B:
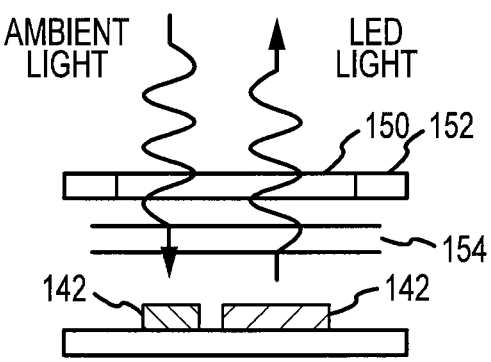

One example of a light sensing and emitting device 140 that may be implemented to backlight the keyboard 112 includes a light sensor 142 and a light source 144, as generally shown in FIG. 6. The light sensor 142 may be a photodiode, a phototransistor, an integrated photodiode and amplifier, or any other suitable photo-sensitive device. In some embodiments, more than one light sensor may be integrated into the device 140. For example, in one embodiment, multiple narrowband light sensors may be integrated into the device 140 and each light sensor may be sensitive in a different portion of the visible light spectrum. Continuing this example, three narrowband light sensors may be integrated into a single sensor package: a first light sensor may be sensitive to light in the red region of the electromagnetic spectrum; a second light sensor may be sensitive in a blue region of the electromagnetic spectrum; and a third light sensor may be sensitive in the green portion of the electromagnetic spectrum. In other embodiments, one or more broadband light sensors (not shown) may be integrated into the device 140. The sensing frequencies of each narrowband sensor may also partially overlap, or nearly overlap, that of another narrowband sensor. Each of the broadband light sensors may be sensitive to light throughout the spectrum of visible light and the various ranges of visible light, i.e. red, green and blue ranges, may be filtered out so that a determination may be made as to the color of the ambient light. The determined color of the ambient light is used to dynamically adjust the output of the light source 144 to provide a visual effect. In one embodiment, the white point of light output from the light source 144 may be adjusted to match the ambient lighting conditions. Although the operation and construction of the device 140 is generally discussed herein, a more thorough discussion is provided in U.S. patent application Ser. No. 12/476,067, which is incorporated by reference herein in its entirety. That application also discusses alternative configurations for the device 140, which likewise may be employed with the methods, techniques and embodiments disclosed herein The light source 144 may be any suitable light emitting element, including incandescent lights, light emitting diodes (LEDs), organic LEDs, solid-state lighting, and so on. The light source 144 may include one or more different colored light emitting elements or light emitting elements that emit light having different wavelengths so that the light source 144 may generate a desired visual effect. In some embodiments, the light source 144 may include a multicolored LED or three LED of different colors. For example, in one embodiment, the light source 144 may be a top firing red, green and blue (RGB) LED that emits light in the red, green and blue portions of the electromagnetic spectrum. The emitted red, green and blue may be combined to achieve a variety of colors and a desired brightness level. Additionally, when the white point output of the light source 144 is adjusted to achieve a desired white point, the output of all other color outputs are adjusted accordingly.

Figure 7A:
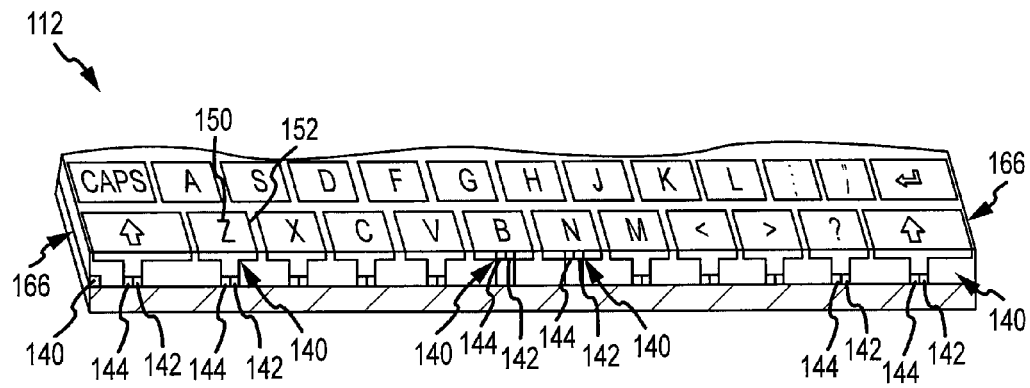
FIGS. 7A and 7B illustrate cross-sectional views of alternative embodiments for implementing light sensor and light source devices in the keyboard of FIG. 4.

The light emitted from the light source 144 and the light sensed by the light sensor 142 passes through an opening 150, wave guide or otherwise transparent portion of a cover, such as a keycap 152 for a key of the keyboard 112, for example. In certain embodiments, a wave guide may communicate the emitted light to the opening from the source, as well as communicating sensed light from the opening to the sensor. Thus, a single wave guide may be shared by both the light source 144 and light sensor 142. FIG. 7A illustrates a cross-sectional view of the keyboard 112 with devices 140 located beneath each keycap 152. Each device 140 may be communicatively coupled to the controller 132 and, hence, each key of the keyboard 112 may be independently backlit according to the ambient light which strikes the particular key. As illustrated, the devices 140 may be located directly under the keycap 152 (as illustrated with respect to keys B and N). Alternatively, the devices 140 may be located some distance from the top of the keycap 152. For example, the devices 140 may be located on a substrate and may receive and transmit light though the keycaps 152 via a waveguide, lens or other device. Additionally, one or more light sensors 142 and/or light sources 162 may be dedicated to a single key, a particular region, or to the entire keyboard 112. For example, in one embodiment, a space bar 168 (FIG. 4) may have several light sensors 142 and light sources 144 dedicated to illuminating it so that illumination may vary across the key. This may be useful, for example, when the ambient light that strikes one end of the space bar 168 may be different from the ambient light to which the other end of the space bar 168 is exposed.

In other embodiments, a light sensor 142 may be positioned in locations other than the keyboard 112 and, further, the light source 144 may illuminate objects other than keys of the keyboard 112. As such, it should be understood that although the discussion has been directed toward implementation in a keyboard, other embodiments may include implementations for lighting and/or backlighting other devices, enclosures, surfaces, etc. In one alternative embodiment, a trademark or symbol on a surface of a device, for example, on a surface opposite of the display 104, may be backlit in accordance with the techniques discussed herein to achieve a desired visual effect.

Figure 7B:
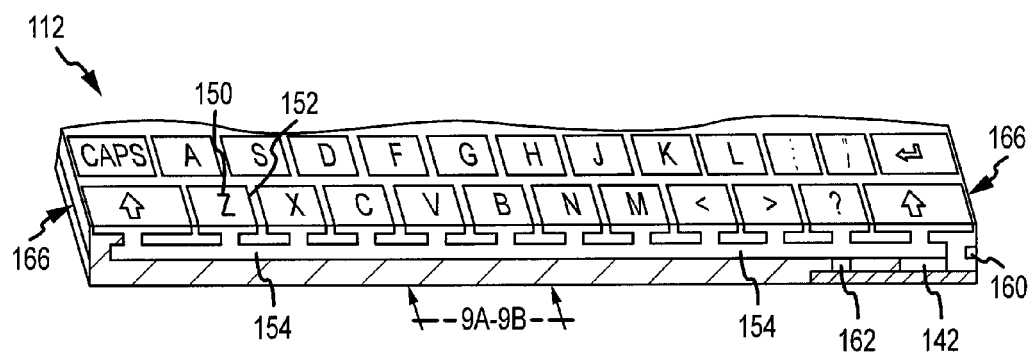
Figures 8A, 8B:
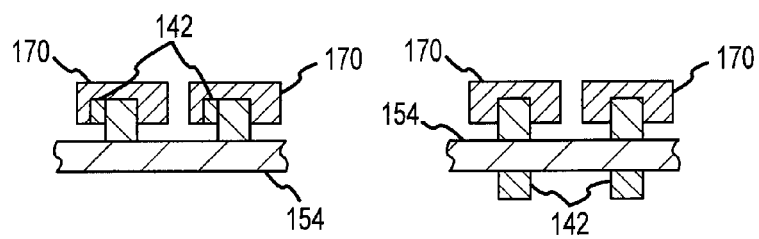
FIGS. 8A and 8B illustrate cross-sectional views of two keys of FIG. 8B showing alternative positioning of light sensors for the distributed light embodiment illustrated in FIG. 8B.
Figure 9:
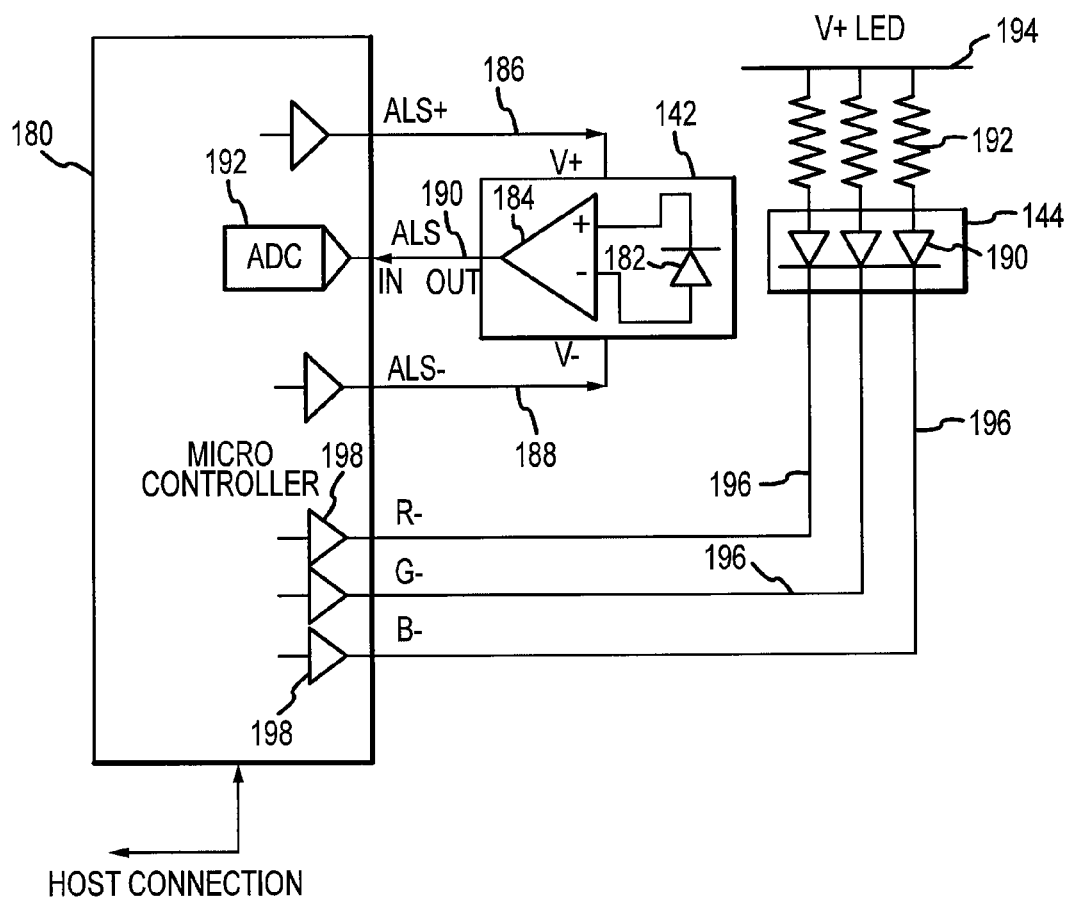
FIG. 9 is a block diagram of a sample light control system in accordance with an embodiment.

While the light sources and the light sensors have been described as being co-located in the devices 160 and 140, it should be understood that the light sources 144 and 162 of the device 160 and 140 may be packaged separately and located in different positions from the light sensor 142. For example, FIGS. 7A-7B illustrate embodiments where the light sensors 142 and the light sources 162 may be separated. Specifically, the light sensors 142 may be co-located with the keys while the light sources 162 may be remotely located from the keys or even the keyboard 112. For example, in FIG. 8A the light sensors 142 may be positioned directly under the keycaps 170 of the keys, while the light source 162 may be distributed to the keys via the light distribution network 154. In another embodiment, light sensors 142 may be positioned beneath the light distribution network 154 while the light source 144 is distributed via the light distribution network 154. In other embodiments, there may be one or more light sensors 142 for one or several keys. Further, in other embodiments, the light source 144 may be co-located with the keys and the light sensor 142 may be located remotely from the keys, as shown in FIGS. 8A-8B. In particular, FIG. 8A shows the sensor 142 being located directly beneath a key cap 170 and FIG. 8B shows the sensor 142 located near the light distribution network 154. In both FIGS. 8A and 8B, the light source 162 may be located remotely from the light sensors 142. Moreover, one or more light sensors 142 may be located near the display 104 (FIG. 3) rather than near or under the keyboard 102. As such, various different configurations may be provided to achieve a desired light sensitivity and light output.

Figure 10:
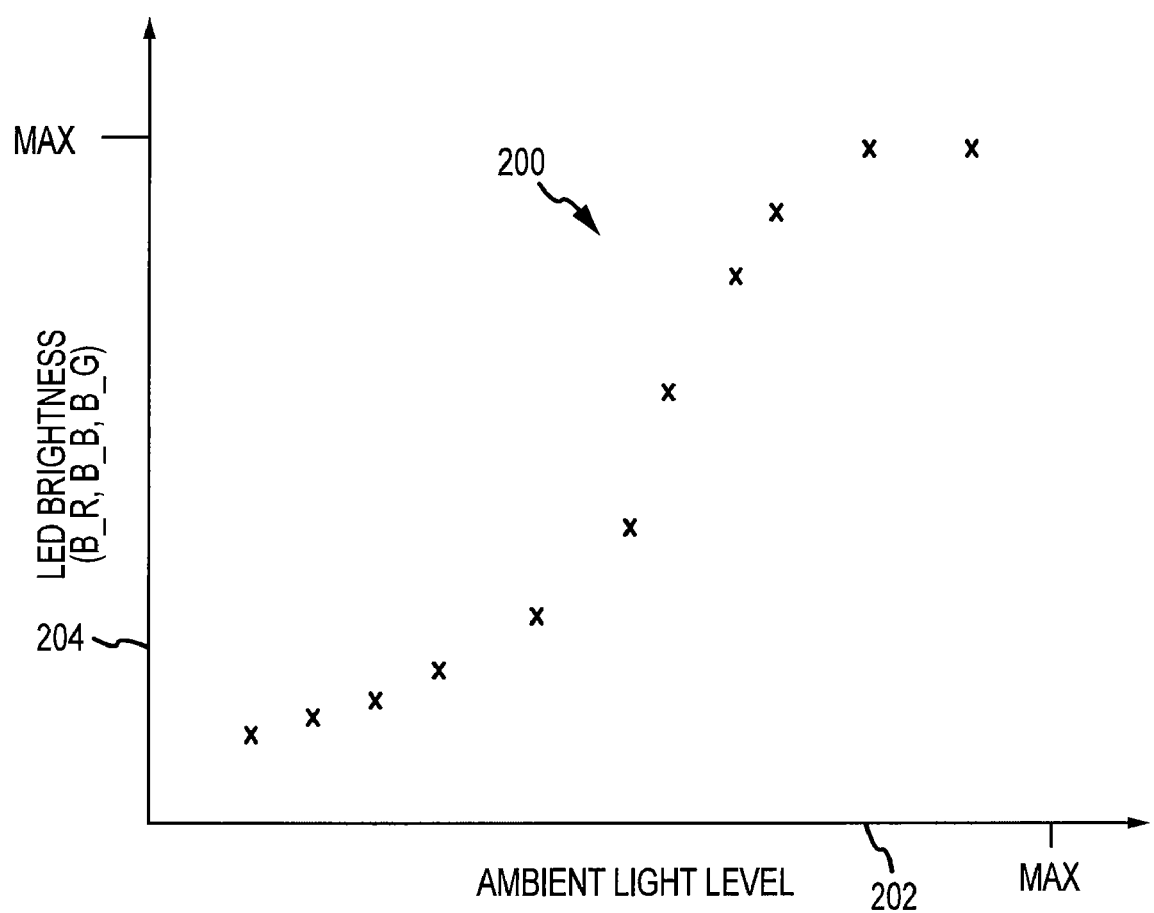
FIG. 10 is a plot illustrating a transition curve for light output relative to a determined level of ambient light.

FIG. 10 illustrates block diagram of an embodiment with the light source 144 and the light sensor 142 coupled to the controller 132. The illustrated light sensor 142 includes a photodiode 182 with an amplifier 184. A positive and negative rail voltage 186 and 188 may be supplied to the light sensor 142 from the controller 132 for the operation of the amplifier 184. An output 190 of the light sensor 142 is coupled to an analog-to-digital converter (ADC) 192 that may be part of the controller 132. The ADC 192 converts analog signals generated by the light sensor 142 into a digital signal to be processed and/or interpreted by the controller 132 or a host. For example, the controller 132 may receive a converted digital signal and determine the brightness of ambient light in which the multicolored light source 144 is operating. The controller 132 may then adjust the output of the light source 144 to achieve a desired visual effect according to ambient light conditions that are determined in real time. Stated differently, the controller 132 may dynamically adjust the light output (both intensity and color) based on current lighting conditions in which a light source is operating.

As illustrated, the light source 144 may include multiple LEDs 190. Specifically, the light source 144 may include a red LED, a green LED and a blue LED. The multiple LEDs 190 may be used together to emit a range of colors and brightness levels. The individual control of the LEDs 190 may be conducted in several different ways. In one embodiment, for example, each anode 192 of the LEDs 190 in the light source 144 may be coupled to a common supply voltage 194, while each cathode 196 is independently coupled to buffers 198 within the controller 132. Thus, each of the LEDs 190 may be independently actuated to achieve a desired color and brightness. The controller 132 may be configured to operate the LEDs 190 according to a particular lighting and/or coloring scheme. In one embodiment, the controller 132 may be configured to follow a programmed color and intensity scheme to achieve a desired white point based on the ambient lighting conditions.

The desired color and intensity output for particular ambient conditions may be empirically determined. Specifically, the light source 144 and light sensor 142 may be operated in various ambient lighting conditions and the output of the light source 144 may be adjusted under each of the various conditions until a desired white point for the ambient lighting conditions is achieved. The ambient lighting (both color and intensity) may be recorded along with the light output (i.e. the color and intensity) from the light source 144 that provided the desired white point. Specifically, the operating parameters such as input current and/or voltage for each of the LEDs 190 of the light source is recorded for each ambient light condition. Hence, one or several tables may be produced that can be used to determine the output from each light source necessary to achieve a desired white point for different ambient lighting conditions.

In addition to adjusting the white point of the light outputted by the source 144, another possible visual effect that may be produced may be referred to as "constant contrast ratio" illumination. Constant contrast ratio illumination refers to adjusting the brightness of the light source such that, in particular ambient light conditions, the window 150 or part of a key that is illuminated by the light source 144 appears to have the same brightness as a surrounding non-illuminated surface. Thus the illuminated window 150 or surface appears as if it is printed or painted, rather than illuminated. In short, an illuminated key does not appear to glow but it is still colored when the light source is active.

In order to achieve this effect, a calibration may be performed to generate a table that represents different possible light outputs that provide a desired visual effect for a variety of ambient light conditions ranging from dark to light. As such the calibration process may begin by measuring ambient light with the ambient light sensor 142. The color and brightness output by the light source 144 is adjusted to achieve an appropriate appearance for the given conditions. The ambient light conditions and the corresponding output brightness and color are then recorded into a calibration table. Different calibration tables may be recorded for particular sets of ambient light conditions. After calibration, the calibration table may be used for driving the LEDs 190 to a corresponding brightness and color output based on current ambient light as determined by the light sensor 142 and employing one of many possible interpolation algorithms, i.e., linear, logarithmic, exponential, etc., between the points of the calibration table. Where different color LEDs are implemented, each color will have a unique calibration table. Each entry in the calibration table generally includes operating parameters for each of the component elements of the light source 144, such as the individual red, green and blue diodes. The operating parameters for each entry may include a power input to each LED (such as a pulse-width modulation duration for an input to the LED) that is employed to generate a desired "white" color or white point for the aggregate output of the light source. Further, these scaling parameters may be employed when generating other colors, such that the selected white point effectively adjusts all other colors outputted by the light source 144 as well.

Thus, the light source 144 may output a two different wavelengths of light under two different circumstances, but a user may perceive the first and second wavelengths as appearing identical due to changes in ambient light in the two circumstances. For example, the embodiment may be used inside under florescent lights, which are somewhat yellowish. In this case, the embodiment may select a white point having a higher blue content than standard in order to offset the yellow ambient light. Further, when the light source 144 emits a purple light, the source may likewise increase the blue portion of the emitted light to account for the white point selected. Conversely, if the embodiment is operating outside under sunlight, a more yellow white point may be selected to create the visual appearance of "true white" and a purple color emitted by the light source 144 may have more yellow or red than under neutral lighting conditions.

FIG. 10 illustrates a plot 200 of a transfer curve for example data points (shown as "x") of a calibration table. The horizontal axis 202 represents an ambient light level having a scale relative to a maximum level that may be detected. The vertical axis 204 represents the brightness of the light sources relative to a maximum brightness level. Each data point is generated by determining the ambient light level and then determining an appropriate brightness and color level for the light source to achieve the desired effect, such as constant contrast ratio, for example. As the light source 144 may include more than one color and as each color may be independently controlled to achieve a desired color and brightness output, there may be multiple points, each having a unique brightness and color for each level of ambient light. Once sufficient data points have been collected to establish a range of data from a minimum to a maximum ambient light level with each point offset from its neighbors by no more than a maximum allowable interval, the data points may be programmed into a controller so that the controller may operate the light sources according to the desired visual effect based on the determined amount of ambient light.

In some embodiments, in order to operate the light source 144 and the light sensor 142 without the light sensor 142 being influenced by the output of the light source 144, a time division multiplexing (TDM) scheme is implemented by the controller 132. Additionally, a pulse width modulation (PWM) scheme may be implemented to allow the controller 132 to control the brightness and color output of the light source 144.

Figure 11:
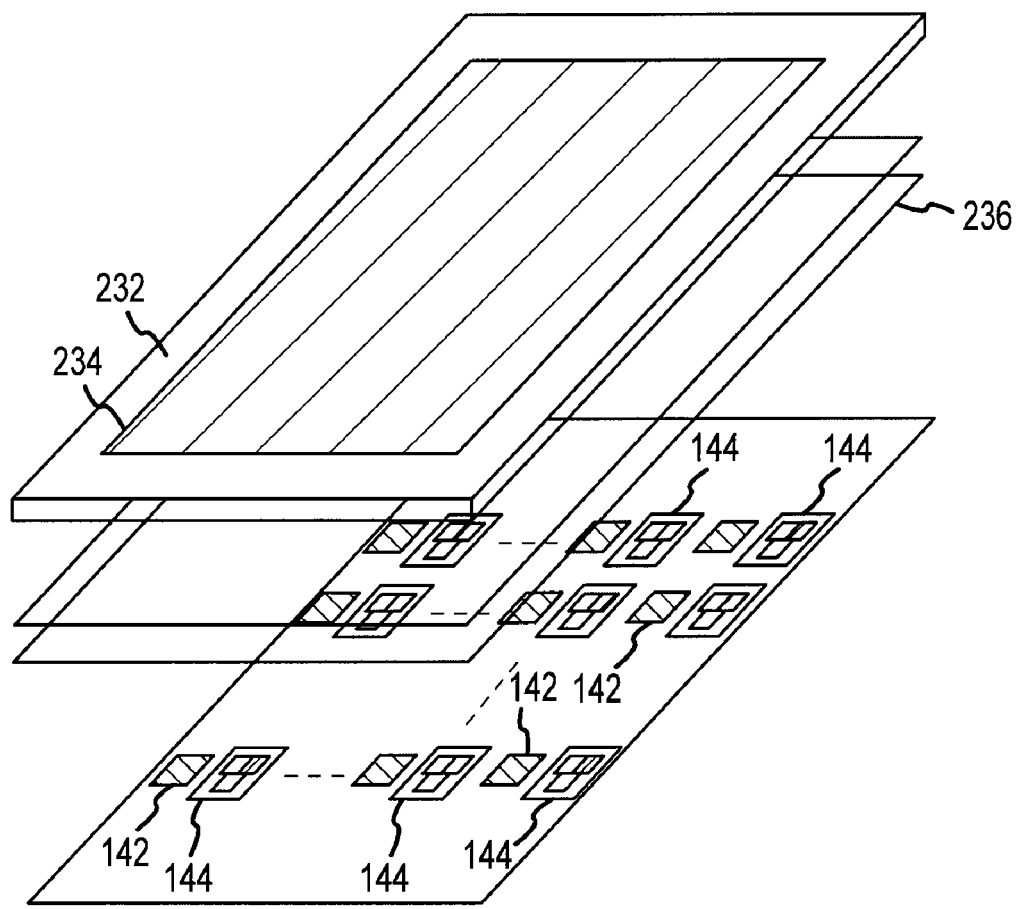
FIG. 11 illustrates an array of light sensors and light sources being controlled by a controller in a master slave configuration.

FIG. 11 illustrates implementation of an array 230 of light sources 144 and light sensors 142. The array 230 may be implemented to illuminate and provide visual effects to a larger surface than the embodiments described above. Additionally, the array 230 may provide for a diverse field of visual effects based on the determined ambient light for the illuminated surface. As illustrated, the light sensors 142 and the light source 144 may be located under a single surface 232 that is to be illuminated. For the purposes of this discussion, the top surface of all the keys of the keyboard 112 may be considered a single surface that is to be illuminated by the array 230. In one embodiment, the surface 232 may include a clear window 234 or multiple windows which may be illuminated or through which the light from the light sources 14 may shine. Additionally, as with other embodiments, other layers 236 may be used to diffuse, mix or shape the light. Specifically, for example, light guides, lenses, filters, holographic diffuses, etc. may be positioned between the surface 232 and the light sources 144 and light sensors 142. In one embodiment, the array 230 may be controlled by a single controller 132, as discussed above, to operate the light sources 144 and light sensors 142 in a TDM and PWM manner to achieve a desired effect. In an alternative embodiment, multiple controllers are implemented to operate the array 230, with each controller controlling a different number of light sources and/or light sensors.

Figure 12:
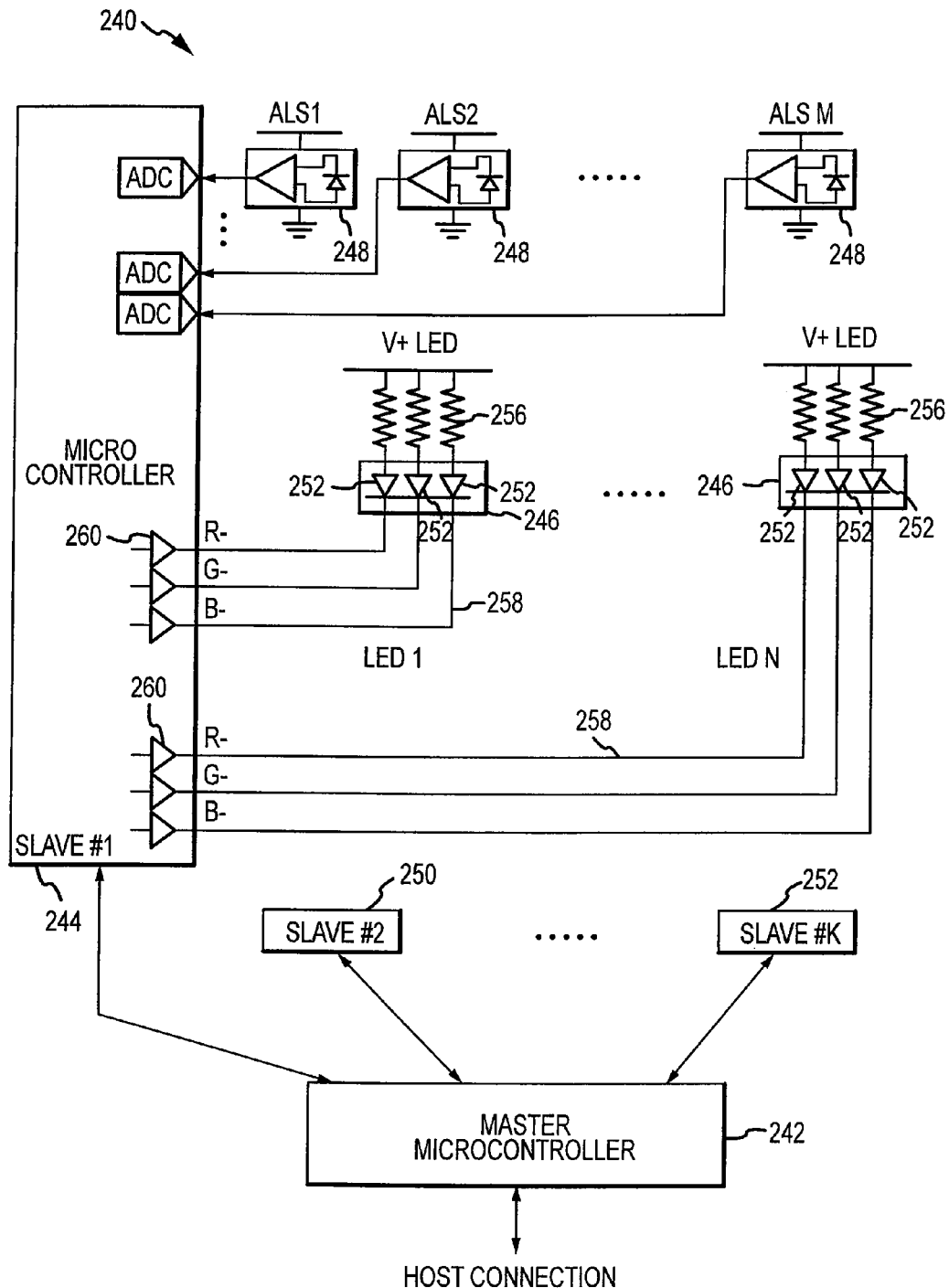
FIG. 12 is a block diagram illustrating a master and slave configuration for operating light sensor and light source arrays in accordance with an embodiment.

FIG. 12 illustrates a block diagram 240 of an embodiment having a master microcontroller 242 configured to control an arbitrary number K slave controllers in a master-slave configuration. For example, a slave controller 244 may control the actuation of N light sources 246 and M light sensors 248. Additional slave controllers 250 and 252 may control actuation of other arrays of light sources and light sensors (not shown). In some embodiments, the master controller 242 may also control an array of light sources and light sensors.

The array 230 may have several different arrangements. For example, in one embodiment, there may be more light sources 246 than light sensors 248 and, as such, a single light sensor may sense ambient light for more than one light source 246. In other embodiments, there may be the same number of light sensors 248 as light sources 246 or even more light sensors 248 than light source 126. Additionally, in one embodiment, one controller may be dedicated to operating light sources and another controller may be dedicated to operating the light sensors.

The array 230 may be useful for providing a "painted light surface" effect similar to the constant contrast effect previously mentioned and defined. In the painted light surface embodiment, the array 230 of light sources 246 with each coupled to one or more light sensors, which may be integrated with or separate from the light source, may be placed underneath the larger surface and spaced such that the light shines through the surface when the light sources are driven. The control of the light sources 246 may be calibrated so that a surface appears uniformly painted in a range of ambient light conditions, following the process set forth above. The operation of the light sources 246 and the light sensors 248 of the array 230 is similar to that discussed above. In particular, each LED 254 of the light sources 246 may be individually controlled to provide a desired effect.

Several different arrangements are possible for arrayed light sensors and light sources. In general, N light sources and M ambient light sensors may be implemented for a particular application, where N and M may or may not be equal. In one embodiment, the anodes 256 of each of the LEDs 254 may be coupled together while the cathodes 258 of the LEDs 252 may be coupled independently to buffers 260 in the controller 244. Hence, each of the LEDs 252 may be independently controlled by the controller 244. Additionally, each of the other controllers 250 and 252 may independently control light sources (not shown) to create a desired visual effect. That is, in one embodiment the N light sources 246 and the M light sensors 248 to be controlled by different controllers.

It should be noted that certain timing schemes may be employed to operate the light sources 246 and/or light sensors 248. Such timing schemes, including methods and embodiments for synchronizing operation of the sources and sensors, are disclosed in U.S. patent application Ser. No. 12/476,067, previously incorporated by reference in its entirety.

Figure 13:
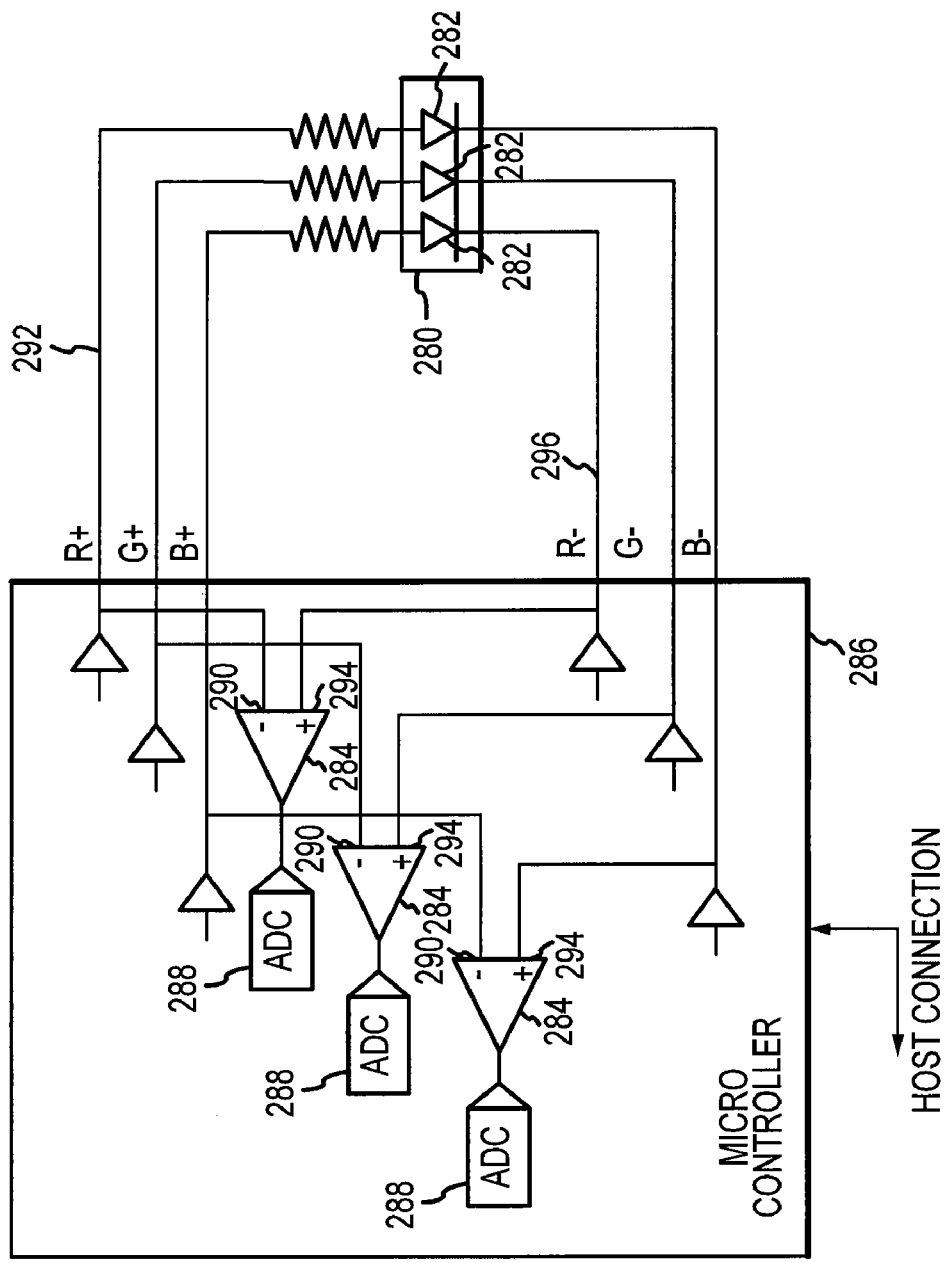
FIG. 13 illustrates one sample implementation of a light source as a light sensor in accordance with an alternative embodiment.

In some embodiments the light sources may also operate as light sensors. As illustrated in FIG. 13, a light source 280 may operate as both a light source and a light sensor. The light source 280 may be an LED or a multicolor LED light, such as the RGB LED light source shown. Each LED 282 of the light source 280 may operate as a separate light sensor. Hence, there is no separate light sensor.

In order to operate as a light sensor, the light source 280 is biased in a non-conducting direction. That is, each LED 282 may be reverse biased. In order to reverse bias the LEDs 282, amplifiers 284 are provided in a controller 286 that is configured to control the operation of the light source 280. The amplifiers 284 are coupled in between an ADC 288 and the light source 280. Specifically, inverting inputs 290 of the amplifiers 284 are coupled to the anodes 292 of the light source 280 and non-inverting inputs 294 of the amplifiers 284 are coupled to the cathodes 296 of the light source 280. Each LED 282 of the light source 280 has a leakage current that will dissipate normally either through the diode itself or the large input impedance of the micro-controller in the High-Z state (in the megaOhm range). This increases proportionally to the brightness or the level of ambient light. Thus, if the LEDs 282 are driven during the period T_LED and then reverse biased and sensed during the T_ALS period, the LEDs 282 may operate as both the light sensor and the light source.

In order to increase the sensitivity, results from sensing of multiple LEDs (or R, G, and B components) can be added together, either in analog or in the digital domain. That is, light sensed by each of the LED 282 of the light source 280 may be added together to determine the amount of ambient light. The determined amount of ambient light may then be used to determine a corresponding light output for the determined ambient light conditions by referencing a calibration table, as discussed above. Thus, the controller 286 may operate the light source 280 to provide a dynamic, desired light output based on current ambient light conditions.

Figure 14:
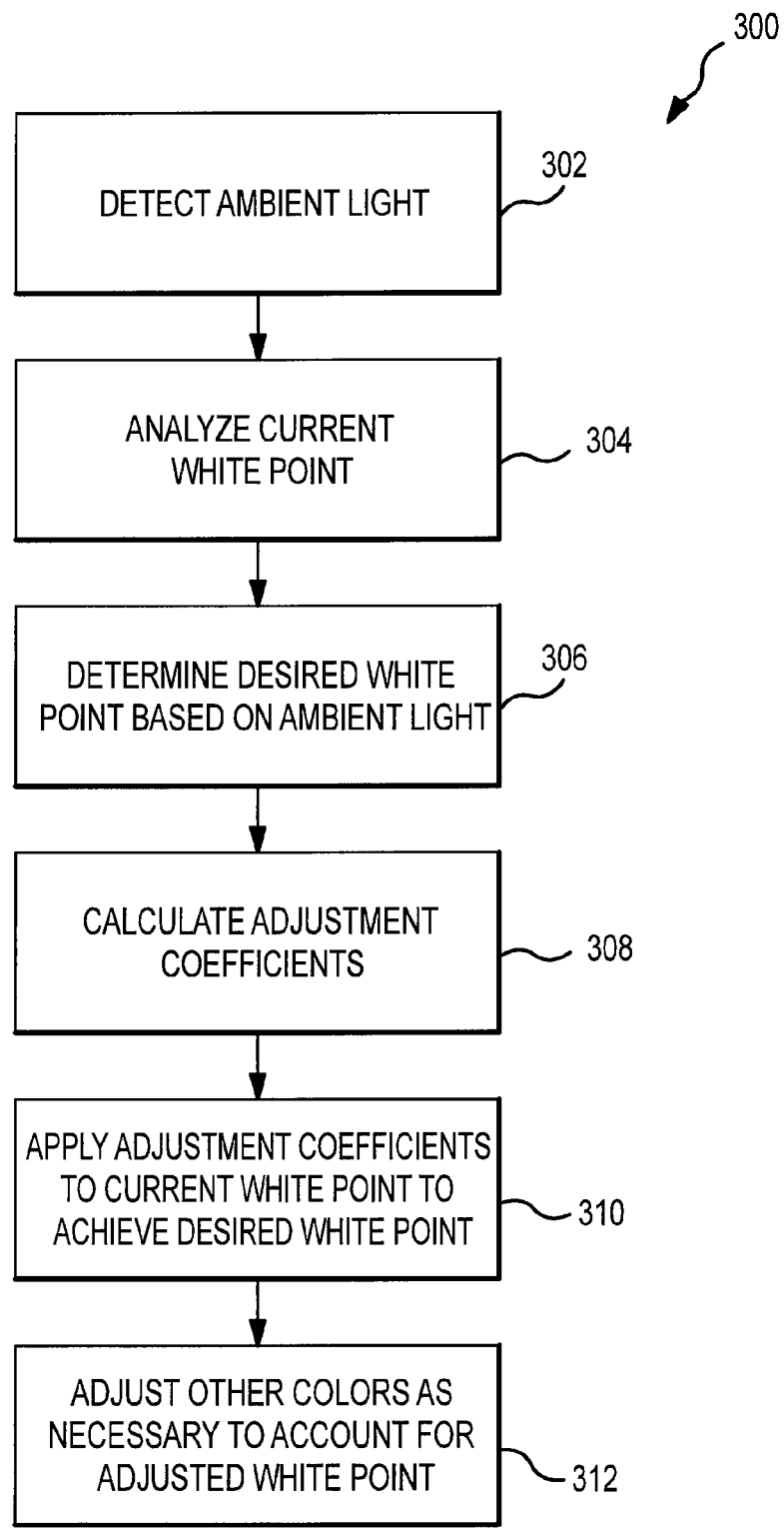
FIG. 14 is a flowchart illustrating a process for adjusting white point.

FIG. 14 is a flowchart illustrating a process 300 for adjusting white point. The process 300 begins by detecting the ambient light, as indicated at block 302. As previously discussed the ambient light detection may include the intensity of the light as well as the different color components of the light. The ambient light is analyzed to determine a white point of the ambient light, as indicated at block 304. The ambient light white point is used to determine a desired white point output for light sources for the current ambient lighting conditions, as indicated at block 306. U.S. patent application Ser. No. 12/251,186, titled "Color Correction of Electronic Displays" and filed Oct. 14, 2008, is incorporated herein by reference in its entirety and for all purposes, and describes adjusting for a desired white point. In some embodiments, the desired white point output may be obtained from a transfer curve or table for predetermined desired outputs. Additionally, the desired white point output may be determined through extrapolation or interpolation of data points contained in a transfer curve or table. Adjustment coefficients are calculated such that the desired white point may be achieved under the current ambient lighting conditions, as indicated at block 308. The coefficients may be representative of an actuation time for an LED relative to a light source actuation time period such as T_LED described above. In another embodiment, the coefficient may represent an actuation time relative to a prior actuation period. In yet another embodiment, the coefficient may represent a relative voltage level used for actuation of the LED. The determined coefficient is applied to the operation of the light sources to achieve a desired white point output, as indicated at block 310. In a system implementing multiple light sources, the output of each of the light sources is adjusted to account for the adjusted white point, as indicated at block 312.

Although the present embodiment has been described with respect to particular embodiments and methods of operation, it should be understood that changes to the described embodiments and/or methods may be made yet still embraced by alternative embodiments of the invention. For example, certain embodiments may be implemented to light and/or backlight objects other than keys and keyboards, such as status lights, displays, surfaces and so forth. Yet other embodiments may omit or add operations to the methods and processes disclosed herein. Still other embodiments may vary the rates of change of color and/or intensity. Accordingly, the proper scope of the present invention is defined by the claims herein.

The invention claimed is:

1. A light control system comprising:
a waveguide defining a passage;
a multicolor light source optically coupled to the waveguide;
a light sensor optically coupled to the waveguide, configured to sense ambient light and operate in conjunction with the multicolor light source to provide a visual effect; and
a controller communicatively coupled to the multicolor light source and the light sensor, wherein
the controller determines a white point of the sensed ambient light and dynamically adjusts an output of the multicolor light source based at least partially on the white point of the sensed ambient light;
the light sensor receives ambient light through the passage; and
the multicolor light source emits the output through the passage.

2. The light control system of claim 1 wherein the multicolor light source comprises a red LED, a green LED and a blue LED.

3. The light control system of claim 2 wherein:
the calibration table includes a plurality of entries; and
each of the plurality of entries comprises a red, green and blue value.

4. The light control system of claim 2, wherein the controller employs the white point output to dynamically adjust a non-white output of the multicolor light source.

5. The light control system of claim 1 wherein:
the controller references a calibration table to determine a white point output for the light source; and
the controller uses the white point output to dynamically adjust the output of the multicolor light source.

6. The light control system of claim 5 wherein the controller actuates the red, green and blue LEDs according to the red, green and blue values retrieved from the calibration table.

7. The light control system of claim 1 wherein the multicolor light source comprises a top-firing LED.

8. The light control system of claim 1 wherein the multicolor light source is a side firing LED.

9. The light control system of claim 1 wherein the multicolor light source is configured to back light a keyboard.

10. The light control system of claim 9 wherein the light sensor is located under a keycap for a key of the keyboard.

11. The light control system of claim 1 wherein the light sensor comprises one or more narrowband photosensitive devices.

12. The light control system of claim 1 wherein the light sensor comprises a broadband photosensitive device.

* * * * *